(12) United States Patent
Ryan et al.

(10) Patent No.: US 9,168,805 B2
(45) Date of Patent: *Oct. 27, 2015

(54) HYDRAULIC SUSPENSION SYSTEM FOR LOWERING THE RIDE HEIGHT OF A VEHICLE

(71) Applicant: MSI Defense Solutions, LLC, Morresville, NC (US)

(72) Inventors: Jeffrey S. Ryan, Troutman, NC (US); David J. Holden, Davidson, NC (US); Jeff L. Peterson, Morresville, NC (US)

(73) Assignee: MSI Defense Solutions, LLC, Mooresville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/257,563

(22) Filed: Apr. 21, 2014

(65) Prior Publication Data

US 2014/0225336 A1 Aug. 14, 2014

Related U.S. Application Data

(62) Division of application No. 13/280,481, filed on Oct. 25, 2011, now Pat. No. 8,702,109.

(60) Provisional application No. 61/406,355, filed on Oct. 25, 2010.

(51) Int. Cl.
*B60G 17/00* (2006.01)
*B60G 17/02* (2006.01)
(Continued)

(52) U.S. Cl.
CPC .............. *B60G 17/00* (2013.01); *B60G 17/021* (2013.01); *B60G 17/08* (2013.01); *B60G 17/0152* (2013.01); *B60G 2400/80* (2013.01); *B60G 2500/30* (2013.01)

(58) Field of Classification Search
CPC ......................... B60G 17/0152; B60G 2500/30
USPC ....................................... 280/6.157
See application file for complete search history.

(56) References Cited

U.S. PATENT DOCUMENTS

| 4,033,423 A | 7/1977 | Grosseau |
| 5,135,065 A | 8/1992 | Kawasaki et al. |

(Continued)

FOREIGN PATENT DOCUMENTS

| DE | 003934385 A1 | 4/1991 |
| WO | 2010019038 A1 | 2/2010 |

OTHER PUBLICATIONS

Non-Final Office Action dated Feb. 8, 2013 for U.S. Appl. No. 13/280,481.

(Continued)

*Primary Examiner* — Karen Beck
(74) *Attorney, Agent, or Firm* — Jeffrey C. Watson; Balser & Grell IP Law

(57) ABSTRACT

A hydraulic system for lowering the ride height of a vehicle includes at least one hydraulic shock mounted to the suspension of the vehicle. Each of the hydraulic shocks has a floating bearing in the hydraulic shock, and an inlet. The inlet is hydraulically connected to a central manifold that is adapted to move fluid into and out of the hydraulic shock for moving the floating bearing in each of the hydraulic shocks. When the floating bearing is moved in the hydraulic shock, the hydraulic shock shortens thereby lowering the ride height of the vehicle.

20 Claims, 16 Drawing Sheets

(51) Int. Cl.
*B60G 17/08* (2006.01)
*B60G 17/015* (2006.01)

(56) References Cited

U.S. PATENT DOCUMENTS

| | | | |
|---|---|---|---|
| 5,181,696 A | 1/1993 | Abe |
| 5,344,189 A | 9/1994 | Tanaka et al. |
| 5,364,122 A | 11/1994 | Ichimaru |
| 5,664,649 A | 9/1997 | Thompson et al. |
| 5,700,026 A | 12/1997 | Zalewski et al. |
| 5,794,966 A | 8/1998 | MacLeod |
| 5,961,106 A | 10/1999 | Shaffer |
| 6,135,434 A | 10/2000 | Marking |
| 6,296,092 B1 | 10/2001 | Marking et al. |
| 6,311,961 B1 | 11/2001 | Julia |
| 6,311,962 B1 | 11/2001 | Marking |
| 6,394,238 B1 | 5/2002 | Rogala |
| 6,415,895 B2 | 7/2002 | Marking et al. |
| 6,966,412 B2 | 11/2005 | Braswell et al. |
| 6,976,689 B2 | 12/2005 | Hibbert |
| 7,240,906 B2 | 7/2007 | Klees |
| 7,374,028 B2 | 5/2008 | Fox |
| 7,641,028 B2 | 1/2010 | Fox |
| 7,703,585 B2 | 4/2010 | Fox |
| 7,963,509 B2 | 6/2011 | Fox |
| 8,702,109 B2 | 4/2014 | Ryan et al. |
| 2001/0042663 A1 | 11/2001 | Marking et al. |
| 2003/0015846 A1 | 1/2003 | Rogala et al. |
| 2004/0113377 A1 | 6/2004 | Klees |
| 2005/0067237 A1 | 3/2005 | Schurmans |
| 2010/0109277 A1 | 5/2010 | Furrer |
| 2011/0248434 A1 | 10/2011 | Fox |
| 2011/0315494 A1 | 12/2011 | Marking |
| 2012/0048665 A1 | 3/2012 | Marking |
| 2013/0313056 A1 | 11/2013 | Cox et al. |

OTHER PUBLICATIONS

Non-Final Office Action dated Jul. 1, 2013 for U.S. Appl. No. 13/280,481.
Final Office Action dated Oct. 3, 2013 for U.S. Appl. No. 13/280,481.

HYDRAULIC SUSPENSION SYSTEM FOR LOWERING THE RIDE HEIGHT OF A VEHICLE

CROSS-REFERENCE TO RELATED APPLICATIONS

This application is a divisional of and claims priority to U.S. Utility patent application Ser. No. 13/280,481, filed Oct. 25, 2011, which claims priority to U.S. Provisional Patent Application Ser. No. 61/406,355, filed Oct. 25, 2010, both of which are incorporated herein by reference in their entirety.

FIELD OF INVENTION

The instant invention relates to hydraulic suspension systems for vehicles, and more particularly, to a hydraulic suspension system for lowering the ride height of a vehicle.

BACKGROUND OF THE INVENTION

Hydraulic suspension systems with hydraulic shock absorbers or dampers are known and commonly used on most vehicles. A shock absorber is a mechanical device designed to smooth out or dampen shock impulses, and dissipate kinetic energy. Shock absorbers, or merely called shocks, are also known as dampers and dashpots. Pneumatic and hydraulic shock absorbers commonly take the form of a cylinder with a sliding piston inside. The cylinder is filled with a liquid (such as hydraulic fluid) or air. Shock absorbers may include cushions and/or springs. The shock absorber's function in the suspension system of a vehicle is to absorb or dissipate energy acting on the vehicle. While shock absorbers may also serve the purpose of limiting excessive suspension movement, their intended main purpose is to dampen spring oscillations. Shock absorbers use valving of oil and gases to absorb excess energy from the springs. Vehicles typically employ both hydraulic shock absorbers and coil springs or torsion bars. In such a suspension system, "shock absorber" typically refers specifically to the hydraulic piston that absorbs and dissipates (i.e. dampens) vibration.

One requirement with hydraulic suspension systems in vehicles is that they require enough ride height, or ground clearance, to dampen or absorb the terrain being traveled over. The ride height of the vehicle, or the ground clearance of the vehicle, may be relatively small for smaller vehicles and vehicles intended to be driven on smooth surfaces like roads. However, with larger vehicles, like trucks and sports utility vehicles (i.e. SUVs), and vehicles that are designed to be driven off road and over uneven terrain, like military vehicles, the ride height or ground clearance required by the suspension system can be much larger.

One problem discovered in association with a large ride height or the required ground clearance of the vehicle could be the transportation or shipment of the vehicles. For example, if the vehicle needs to be shipped in a container, like the cargo unit of a truck, train, boat, airplane or helicopter, the vehicle may not fit into the container because the vehicle is too tall. As such, there is clearly a need to lower the ride height of a vehicle in order to transport the vehicle in a container, like the cargo unit of a truck, train, boat, airplane or helicopter. Another problem associated with a large ride height or large ground clearance of a vehicle is it may not be ideal for traveling on smoother roads where higher speeds and cornering are desired. For example, multi-purpose vehicles like trucks, SUVs, and even military vehicles come standard with large ride heights or large ground clearances in order for the vehicles to maneuver over uneven terrain or off-road purposes. However, these vehicles are also driven on smooth surfaces like roads at high speeds where cornering may be required. In these situations a lower ride height would be ideal but the vehicle's suspension must still function and dampen the forces acting on the vehicle. As such, it is clear that there is a need for such multi-purpose vehicles to have suspension systems that may be lowered while still functioning to dampen forces acting on the vehicle at a lowered position.

One known solution to lowering the ride height of a vehicle for purposes like transportation is to use mechanical struts to lock the vehicle at a lowered position. The problem with this mechanically locked solution is that it does not allow for the vibrations of the container to be dampened by the suspension system, or the hydraulic dampers, as they are locked into place. Thus, the vibrations of the shipping container, whether it be the vibrations of the truck, train, boat, plain or helicopter go directly into the vehicle which has been discovered to cause damage to the vehicle being shipped. In addition, these mechanical struts clearly would not work for lowering the ride height of the multi-purpose vehicles described previously. Other problems with these mechanical struts that lock the vehicle down is that they are difficult to install and take time and power to lower the vehicle. This may not be ideal for some situations, like military transportation, where time and efficiency are of the essence. As such, there is clearly a need to provide a system for lowering the ride height of a vehicle that still provides damping forces to the vehicle while it is lowered and is quick and easy to operate.

The instant invention is designed to address at least some of the above mentioned problems.

SUMMARY OF THE INVENTION

The instant invention is a hydraulic suspension system for lowering the ride height of a vehicle. The hydraulic suspension system includes at least one hydraulic shock mounted to the suspension of the vehicle. Each of the hydraulic shocks has a floating bearing in the hydraulic shock, and an inlet. The inlet is hydraulically connected to a central manifold that is adapted to move fluid into the hydraulic shock for moving the floating bearing in the hydraulic shock. When the floating bearing is moved in the hydraulic shock, the hydraulic shock shortens thereby lowering the ride height of the vehicle.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
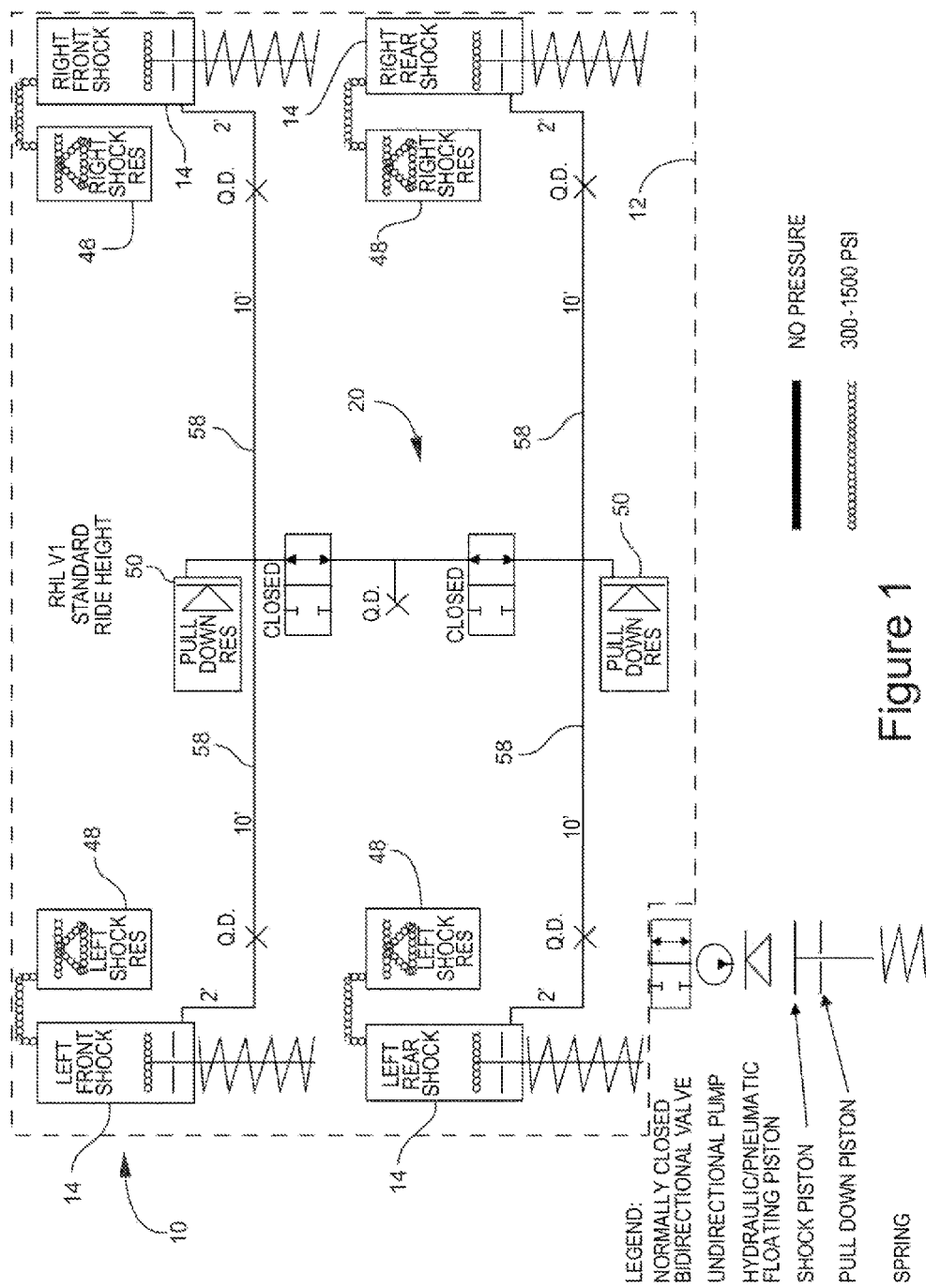
FIG. 1 illustrates a schematic representation of one embodiment of the hydraulic system for controlling the ride height of a vehicle according to the instant invention at standard ride height.

Referring to the drawings, wherein like numerals indicate like elements, there is shown in FIGS. 1-15 an embodiment of a hydraulic system 10 for lowering the ride height of a vehicle. Hydraulic system 10 (may be referred to hereinafter as merely system 10) may be installed on a vehicle 12 to provide a vehicle with the capability of lowering its ride height and still providing at least some damping forces while in the lowered position. Hydraulic suspension system 10 for lowering the ride of a vehicle may be for allowing the remote lowering of a vehicle for purposes of transport or shipment, like in cases of when the vehicle is too tall to fit in a vehicle for transport (such as a helicopter) or when a vehicle needs to ride at a reduced ride height for performance reasons (such as multi-purpose vehicles like trucks, sports utility vehicles, or military vehicles). The hydraulic suspension system 10 may allow the user, or a mechanic or other capable person, to lower the ride height of the vehicle by activating the central manifold of the system. Hydraulic suspension system 10 may generally include at least one hydraulic shock 14 with a floating bearing 16, and a central manifold 20. See FIGS. 1-15. These parts and their intended functions will be described in detail below.

Hydraulic shock 14 may be included in hydraulic suspension system 10 for lowering the ride height of a vehicle. See FIGS. 1-13. Hydraulic shock 14 may be mounted to the suspension of a vehicle 12. Hydraulic shock 14 may be mounted to the suspension of vehicle 12 by any means, including but not limited to, mounting hydraulic shock 14 similar to standard hydraulic shocks or dampers. System 10 may include any number of hydraulic shocks, but typically may include one hydraulic shock 14 for each corner or wheel position of the vehicle. Thus, for example, on a typical four wheel automobile, system 10 may include four hydraulic shocks 14 on each wheel or corner of the automobile. However, the invention is not so limited and may include any number of hydraulic shocks 14 on any combination of corners or wheels. Hydraulic shock 14 may be adapted for lowering the ride height of the vehicle. Hydraulic shock 14 may also be for providing damping forces to vehicle 12 while in a lowered position. Hydraulic shock 14 may be a modified standard shock, including a modified standard passive, active or semi-active shock. Hydraulic shock 14 may be a modified standard shock that is modified to include floating bearing 16 and an inlet 18.

Floating bearing 16 may be included in each of hydraulic shocks 14. See FIGS. 10-13 and 15. Floating bearing 16 may be for moving inside hydraulic shock 14 to shorten the length 15 of hydraulic shock 14. Floating bearing 16 may be any sized or shaped device capable of moving inside hydraulic shock 14 to shorten the length and/or travel distance of hydraulic shock 14. In operation, when floating bearing 16 may be moved in the hydraulic shock 14, the floating bearing 16 may shorten the length 15 and, thus, travel distance of hydraulic shock 14. This operation or movement of floating bearing 16 in hydraulic shock 14 may thereby lower the ride height of vehicle 12. Floating bearing 16 may be mounted on a piston rod 22 in hydraulic shock 14, where floating bearing 16 may be able to move longitudinally along piston rod 22. Floating bearing 16 may have a first fluid tight seal 24 between an outer wall 26 of floating bearing 16 and an inside wall 28 of hydraulic shock 14. Floating bearing 16 may also have a second fluid tight seal 30 between an inner wall 32 of floating bearing 16 and an outside wall 34 of piston rod 22. The combination of first fluid tight seal 24 and second fluid tight seal 30 may allow for floating bearing 16 to be moved longitudinally along piston rod 22 by supplying fluid pressure on one side or the other of the floating bearing 16. In one embodiment, floating bearing 16 may have a donut shaped cross-section 36 (see FIG. 16). This donut shaped cross-section may be adapted for allowing first fluid tight seal 24 to the inside wall 28 of shock 14 and second fluid tight seal 30 to the outside wall 34 of piston rod 22.

In one embodiment, as shown in FIGS. 10-13, the floating bearing 16 may be positioned in the rebound chamber 38 of hydraulic shock 14 and the inlet 18 may be positioned approximate to the bottom 40 of rebound chamber 38. In this embodiment, when the fluid may be moved from the central manifold 20 through inlet 18 to the rebound chamber 38, the floating bearing 16 may be raised in the rebound chamber 38. This motion of raising floating bearing 16 may reduce the combined size of rebound chamber 38 and compression chamber 44, thereby shortening the length 15 and/or travel distance of hydraulic shock 14. However, the invention is not so limited, and the shock may be designed in other various configurations.

Figure 14:
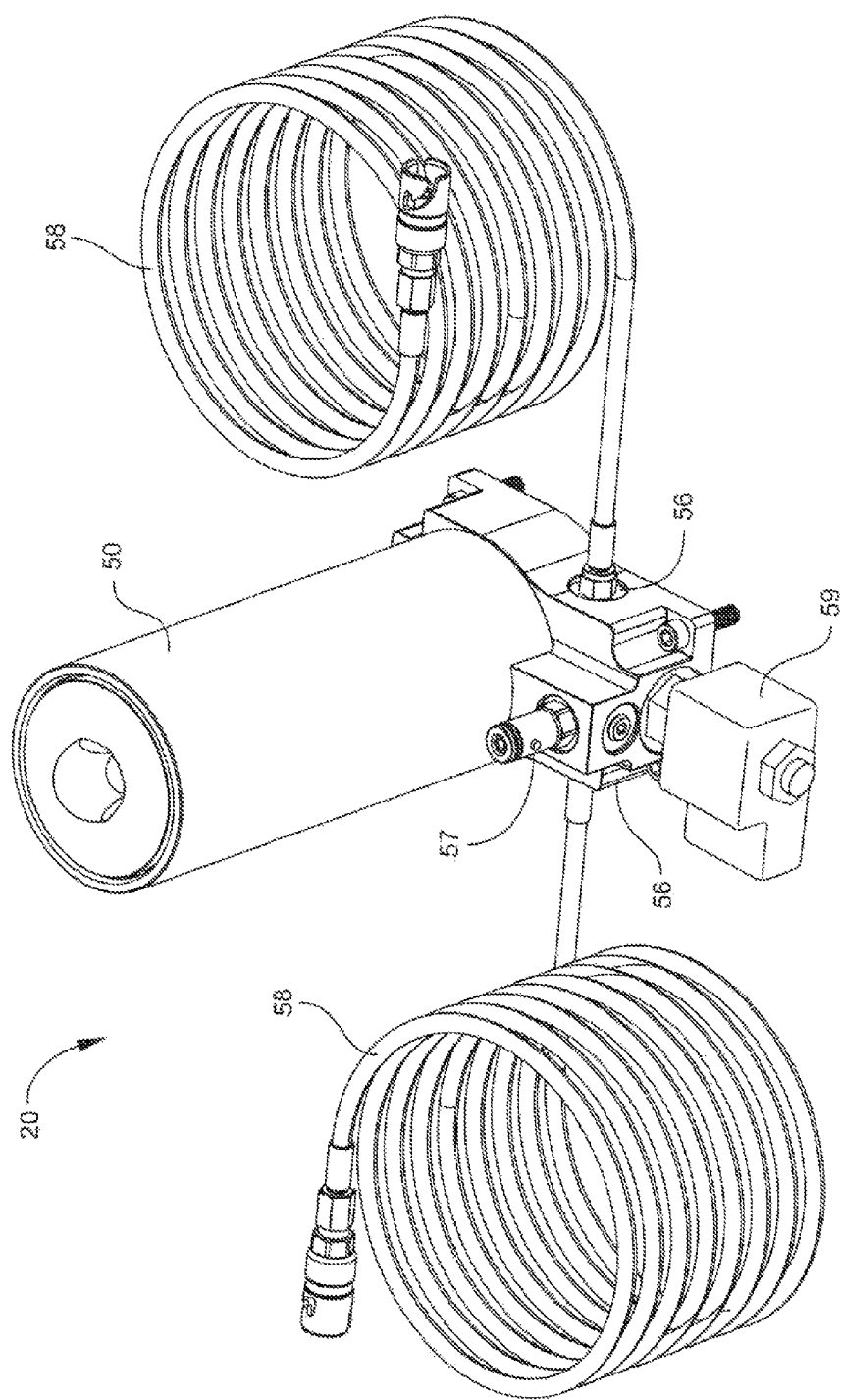
FIG. 14 shows a perspective view of one embodiment of the central manifold and hydraulic fittings for the hydraulic system for lowering the ride height of a vehicle according to the instant invention.
Figure 15:
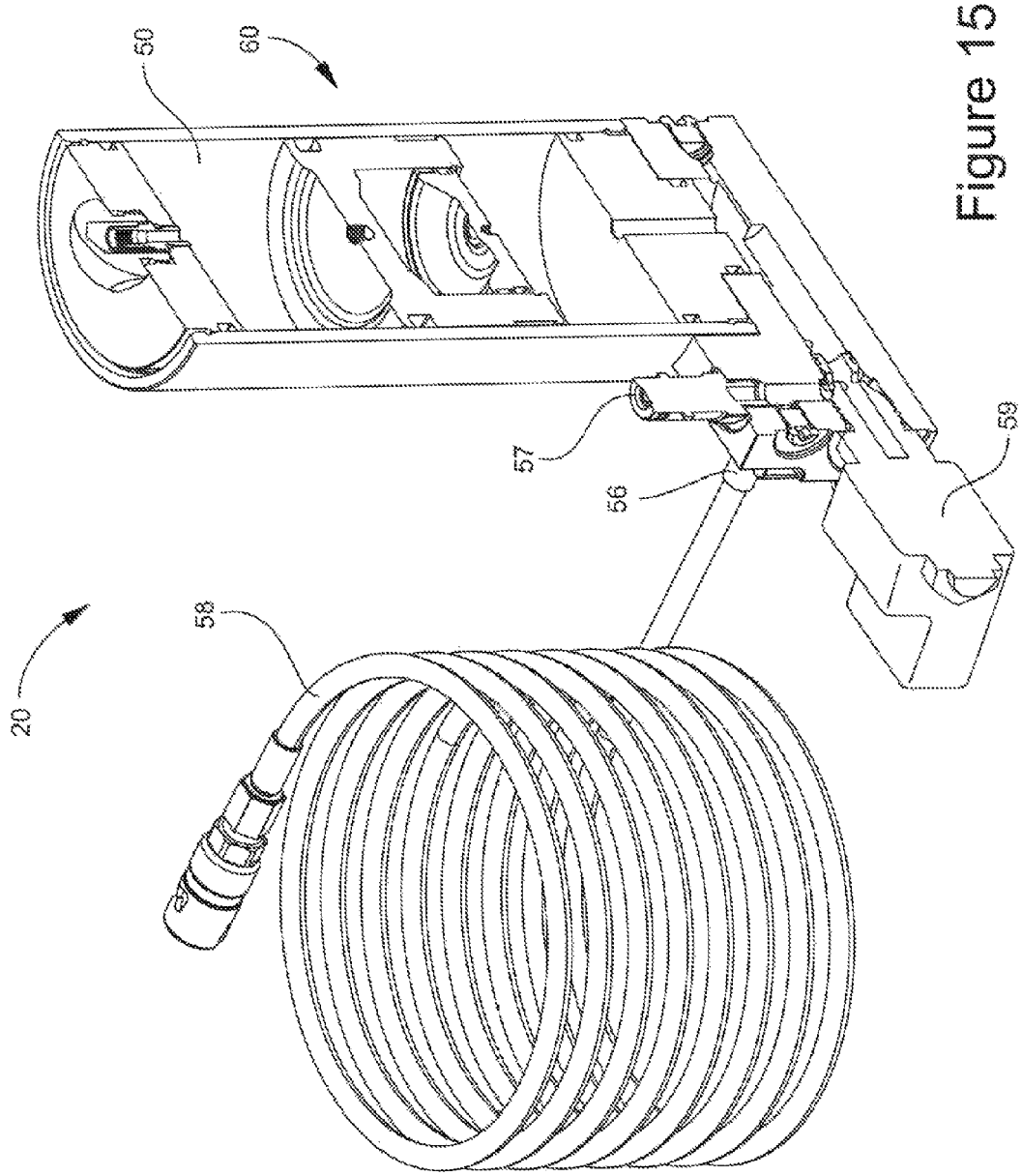
FIG. 15 shows a cross-sectional view of the central manifold shown in FIG. 14.
Figure 16:
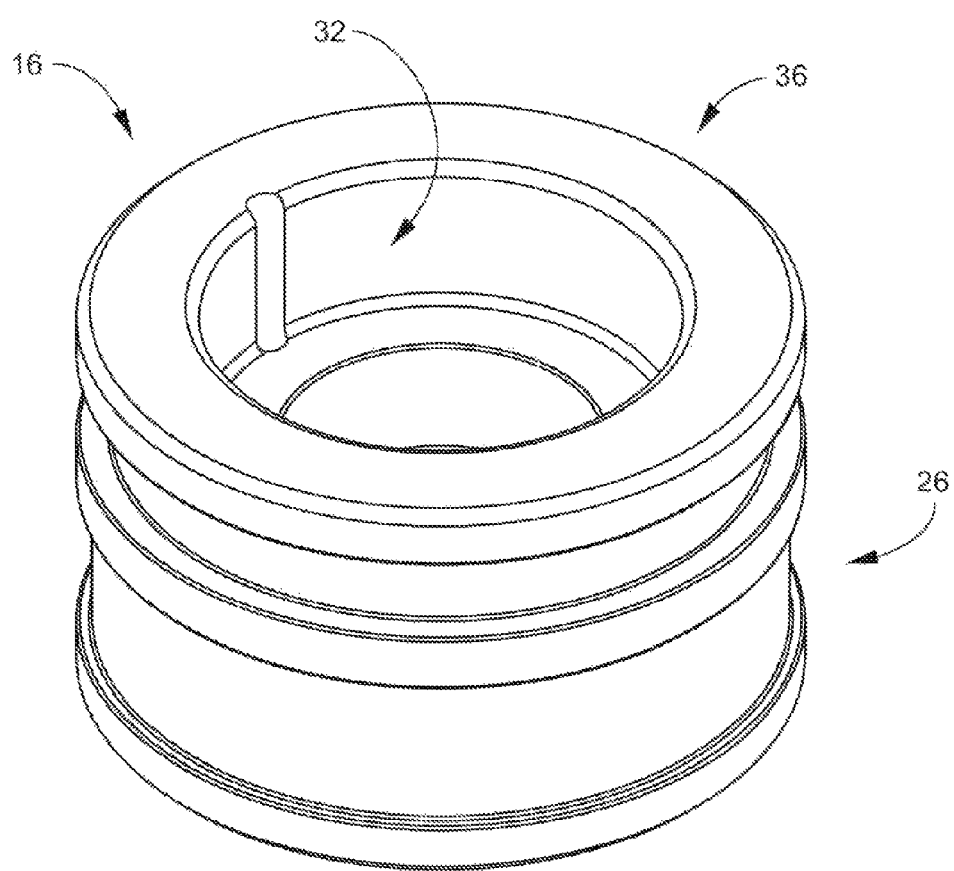
FIG. 16 shows a perspective view of one embodiment of the floating bearing according to the instant invention.

Central manifold 20 may be included with hydraulic system 10 for lowering the ride height of a vehicle. See FIGS. 1-8 and 14-15. Central manifold 20 may be for pumping hydraulic fluid to hydraulic shock 14 for moving floating bearing 16 thereby shortening the length 15 and travel distance of shock 14. For example, as shown in the Figures, central manifold 20 may pump hydraulic fluid at a certain pressure to inlet 18 at the bottom 40 of rebound chamber 38, whereby, floating bearing 16 may raise in rebound chamber 38. Central manifold 20 may be adapted to pump fluid into each of the hydraulic shocks 14 of vehicle 12. Central manifold 20 may be any device capable of pumping hydraulic fluid to hydraulic shock 14. In one embodiment, central manifold 20 may include a fluid accumulator 50, a pump 52 including a power supply 54, and a hydraulic connection 56 and fluid line 58 for each hydraulic shock. In this embodiment, the pump 52 being powered by power supply 54 and connected to pump inlet 57 (as shown in FIGS. 14-15), may pump hydraulic fluid from fluid accumulator 50 through each hydraulic connection 56 through each fluid line 58 and into each hydraulic shock 14. Valve 59 may be included to adjust or control the fluid flowing through hydraulic connections 56 from pump assembly 52, 54. This movement or pumping of fluid from fluid accumulator 50 into hydraulic shock 14 may be adapted for lowering the ride height of the vehicle. In one embodiment, the central manifold 20 may have thermal expansion means 60. Thermal expansion means 60 may be adapted to adjust for thermal expansion of the hydraulic fluid. In one embodiment, thermal expansion means 60 may be a floating piston 61. System 10 may include a single central manifold 20 for controlling all hydraulic shocks 14 of the vehicle or it may include multiple central manifolds 20 for controlling one or more hydraulic shocks 14. For example, one central manifold 20 may be included in system 10 for controlling the front hydraulic shocks 14 and a second central manifold 20 may be included to control the rear hydraulic shocks 14.

A fluid reservoir 48 may be included with each of the hydraulic shocks 14 in system 10 for lowering the ride height of a vehicle. See FIGS. 1-8. Fluid reservoirs 48 may be for taking up fluid when the length 15 and travel distance of hydraulic shocks 14 are shortened to lower the ride height of the vehicle. Thus, each fluid reservoir 48 may be adapted to take up hydraulic fluid from the hydraulic shocks 14 when the ride height of the vehicle 12 is lowered. Fluid reservoirs 48 may be any type of reservoir for taking up fluid from hydraulic shocks 14, including any standard fluid accumulator or reservoir.

Figure 10:
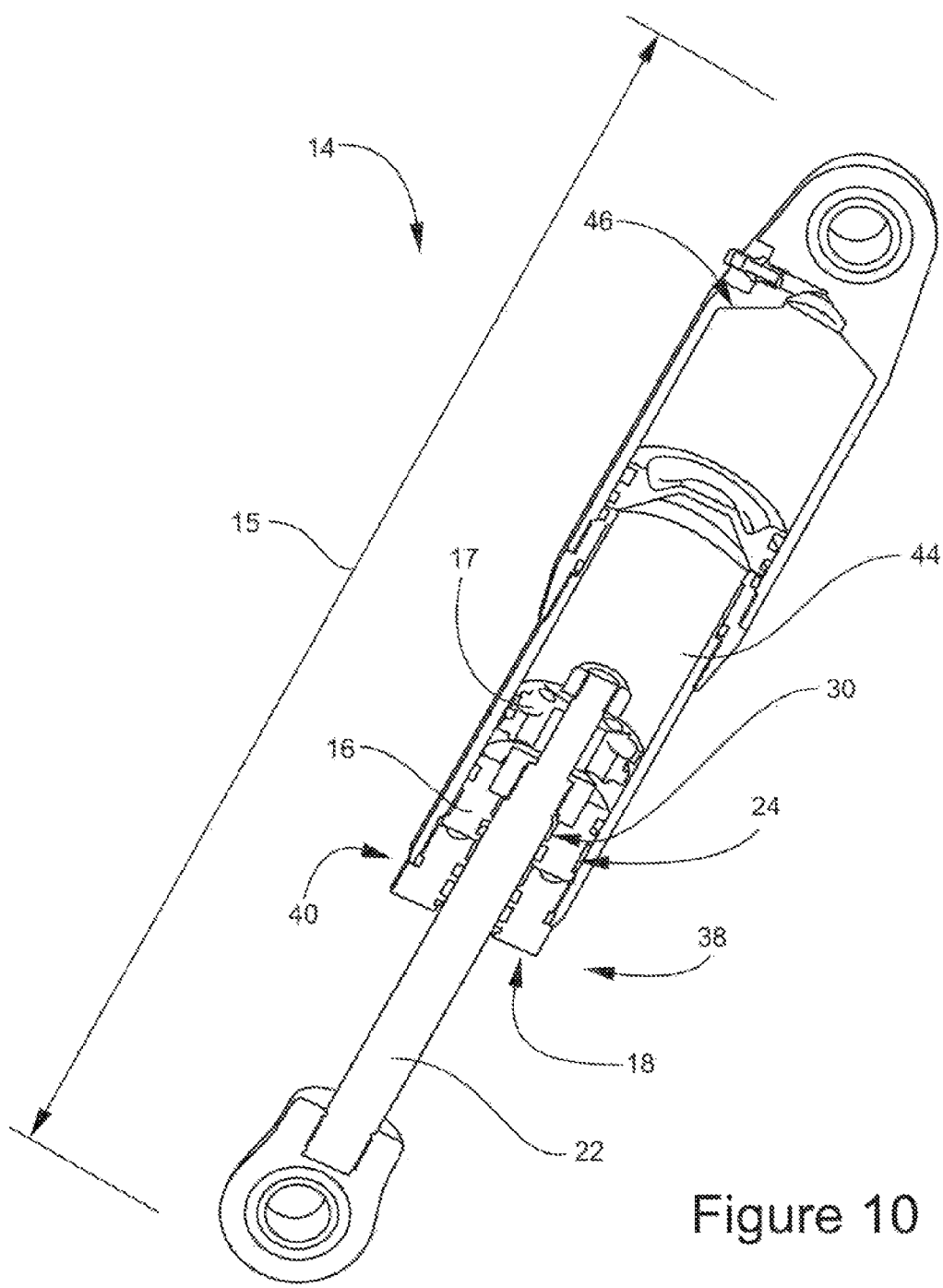
FIG. 10 shows a cross-sectional view of the hydraulic shock shown in FIG. 9 fully extended with the floating in a normal position or at the bottom of the rebound chamber.
Figure 11:
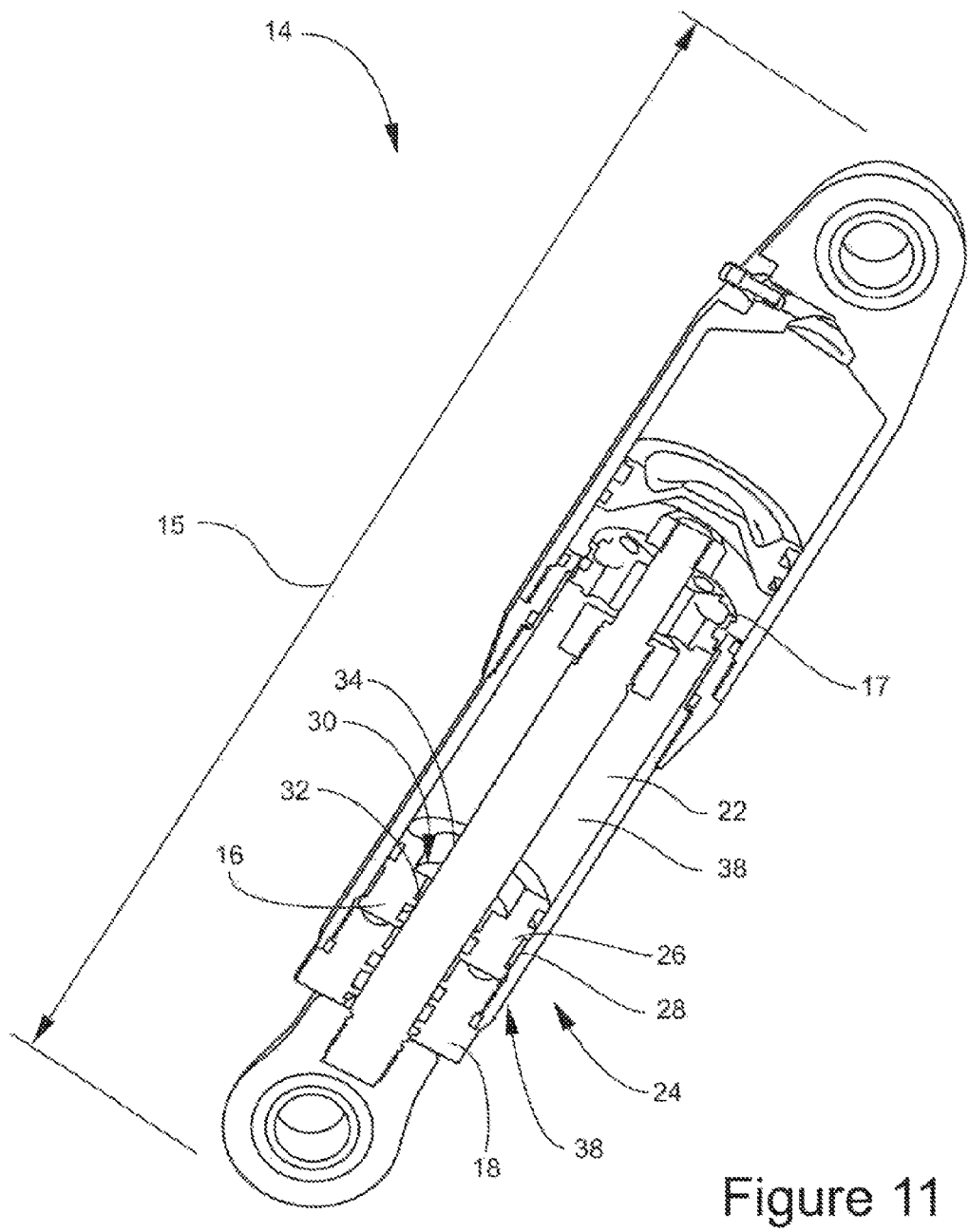
FIG. 11 shows a cross-sectional view of the hydraulic shock shown in FIG. 9 fully compressed with the floating bearing in the normal position or at the bottom of the rebound chamber.

In operation, the central manifold 20 may be connected to each of the hydraulic shock absorbers 14 of vehicle 12. When no power is supplied by the hydraulic power supply 54, no hydraulic fluid is pumped into the shock absorbers 14 from the central manifold 20. In the embodiment shown in the Figures, this allows the floating bearing 16 to remain rested at the bottom 40 of the rebound chamber 38 of the shock absorber 14, where the shock absorber 14 functions normally with standard compression and rebound strokes (see FIGS. 10 and 11). FIG. 10 shows the shock absorber 14 with the floating bearing 16 resting at the bottom 40 of the rebound chamber 38 and the shock absorber fully extended, i.e. the piston 17 is near the bottom of the rebound chamber on top of floating bearing 16. FIG. 11 shows the shock absorber 14 with the floating bearing 16 resting at the bottom 40 of the rebound chamber 38 with the shock absorber fully compressed, i.e. the piston 17 is near the top 46 of the compression chamber 44.

Figure 12:
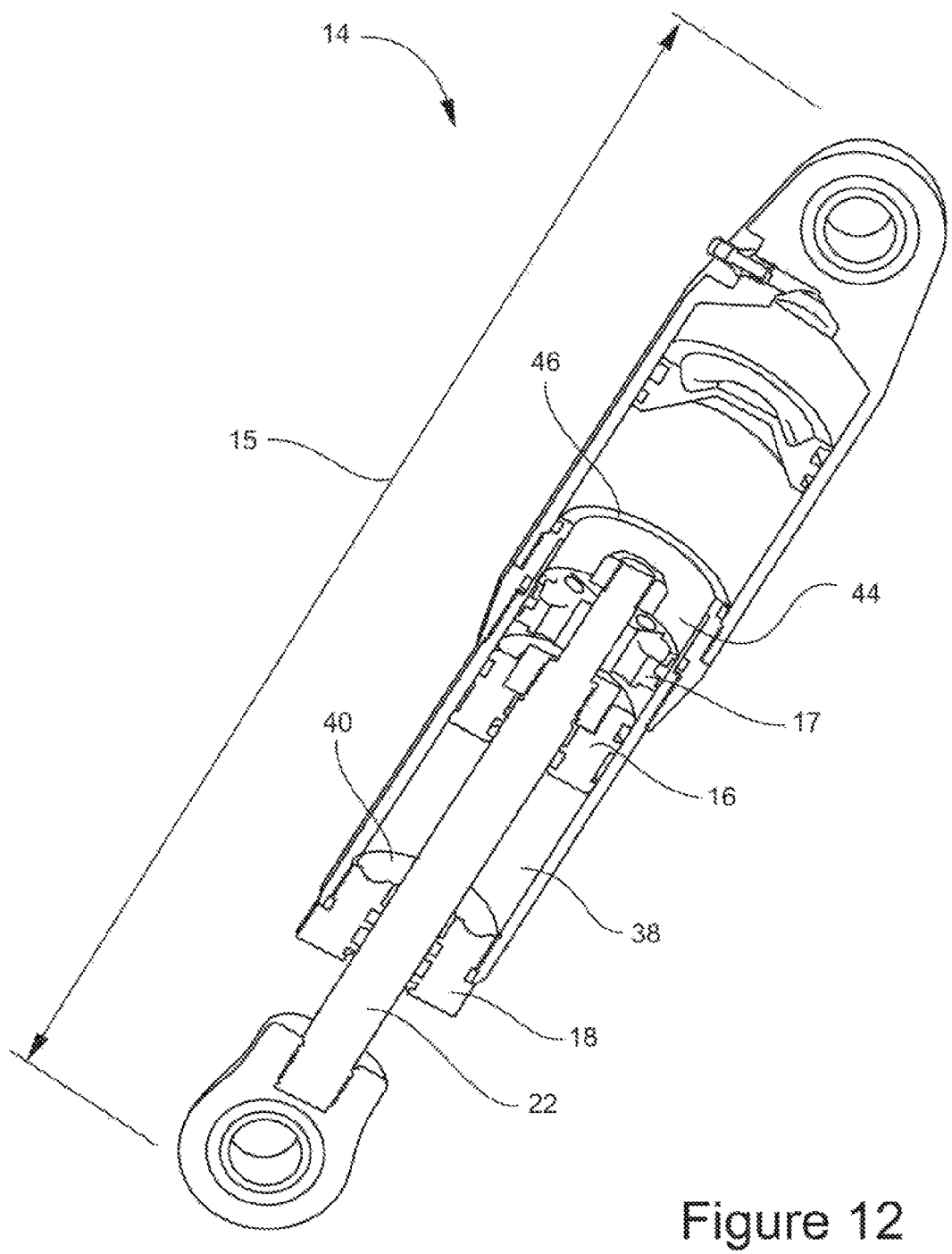
FIG. 12 shows a cross-sectional view of the hydraulic shock shown in FIG. 9 fully extended with the floating bearing in the raised position or near the top of the rebound chamber.
Figure 13:
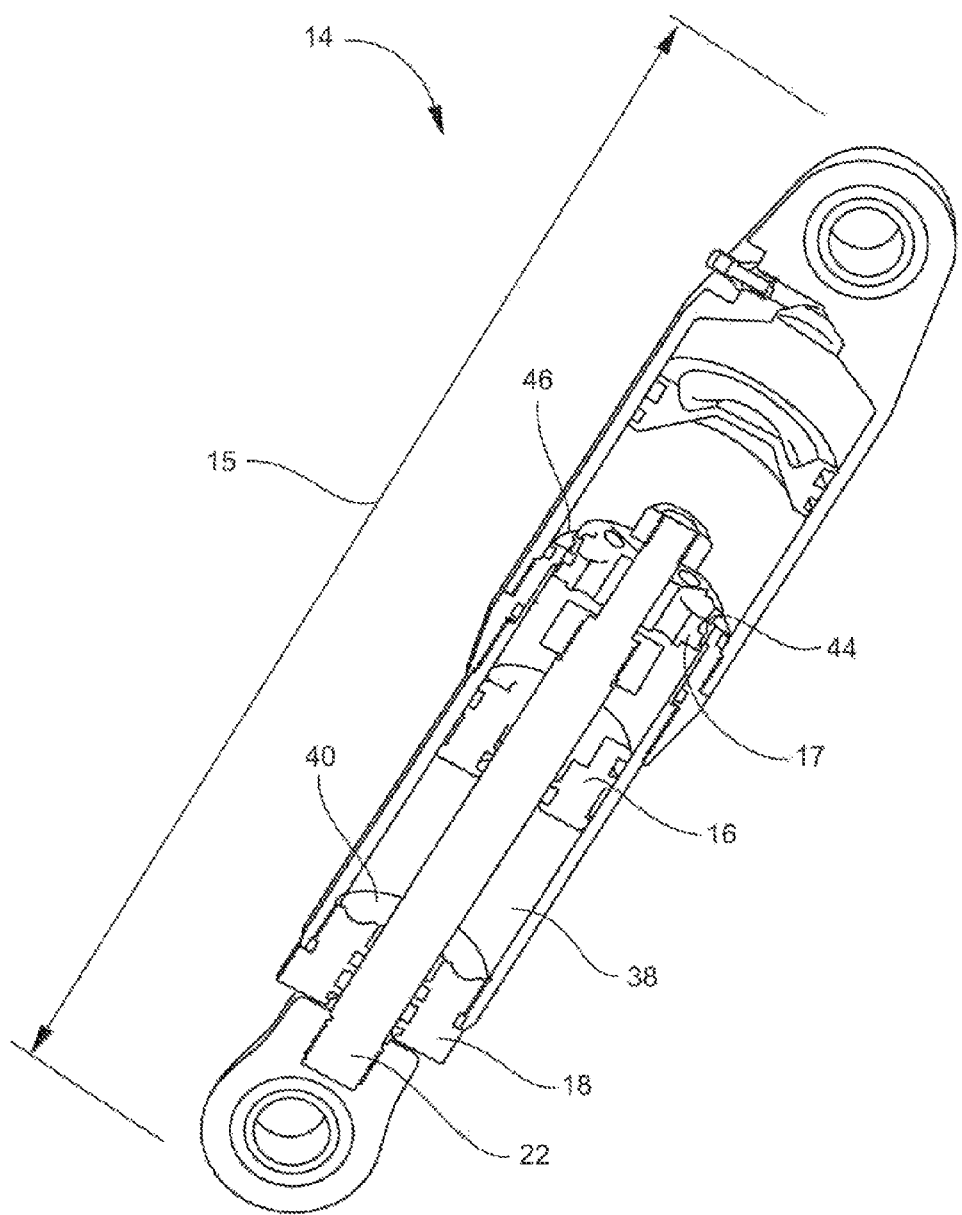
FIG. 13 shows a cross-sectional view of the hydraulic shock shown in FIG. 9 fully compressed with the floating bearing in the raised position or near the top of the rebound chamber.

When power is supplied by the hydraulic power supply 54, hydraulic fluid is pumped into each of the shock absorbers 14 from the central manifold 20. This fluid enters below the floating bearing 16 and forces the bearing to move from the bottom 40 of the rebound chamber 38. This forces the shock absorbers 14 to compress, which shortens the length of the shock absorbers, and thus, lowers the ride height of the vehicle (see FIGS. 12 and 13). FIG. 12 shows the shock absorber 14 with the floating bearing 16 raised from the bottom 40 of the rebound chamber 38 and the shock absorber fully extended, i.e. the piston 17 is on top of floating bearing 16. FIG. 13 shows the shock absorber 14 with the floating bearing 16 raised from the bottom 40 of the rebound chamber 38 with the shock absorber fully compressed, i.e. the piston 17 is near the top 46 of the compression chamber 44. These Figures show that the shock absorber still functions normally; but the compression and rebound strokes have been shortened, i.e., the travel distance of each shock absorber 14 has been shortened. Thus, even when the ride height is lowered with hydraulic system 10, the dampers 14 still remain active and provide damping to bumps or jarring impacts while maintaining a lower ride height for the vehicle.

Figure 2:
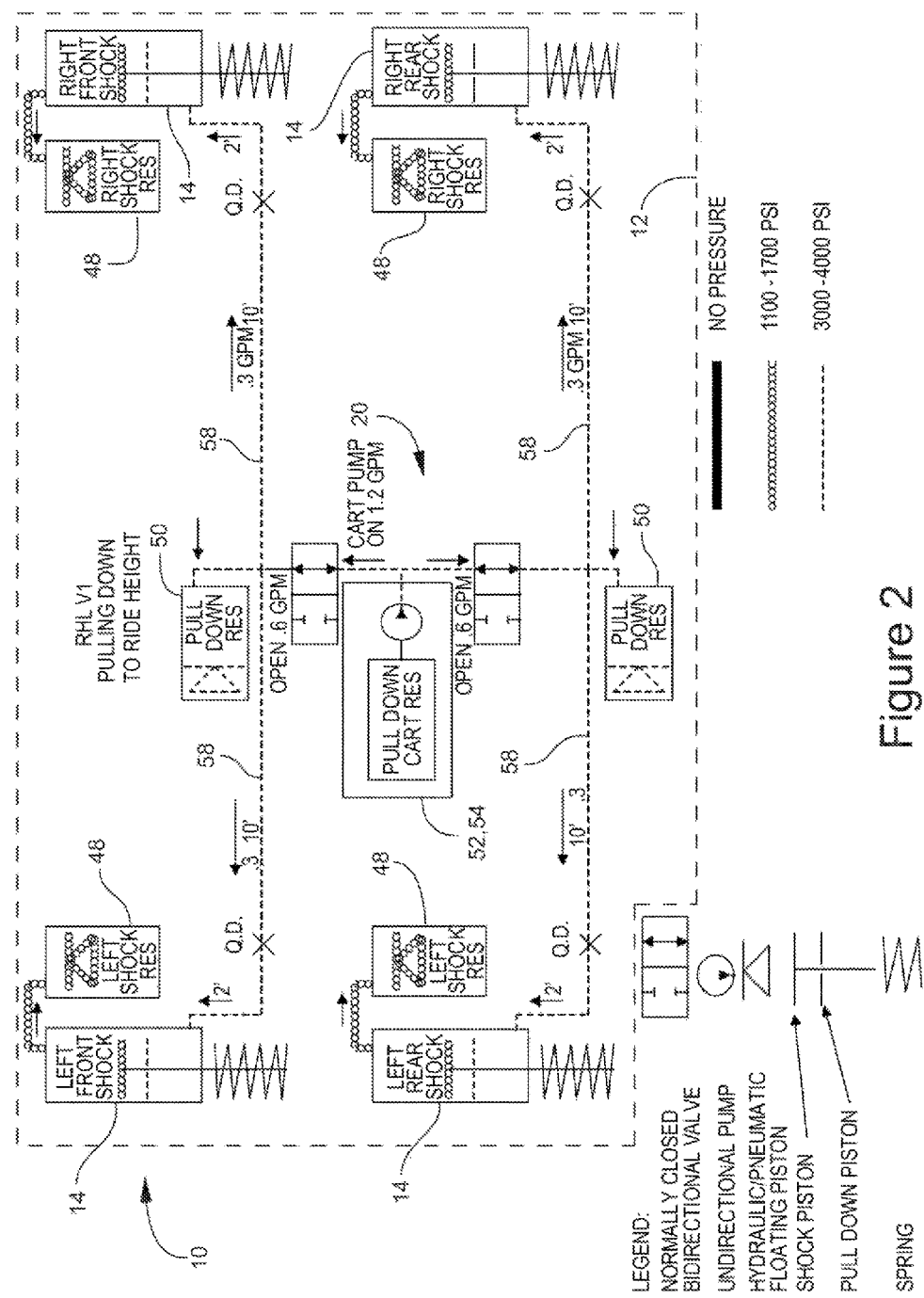
FIG. 2 illustrates a schematic representation of the hydraulic system for controlling the ride height of a vehicle shown in FIG. 1 with the ride height pulling down or being lowered.
Figure 3:
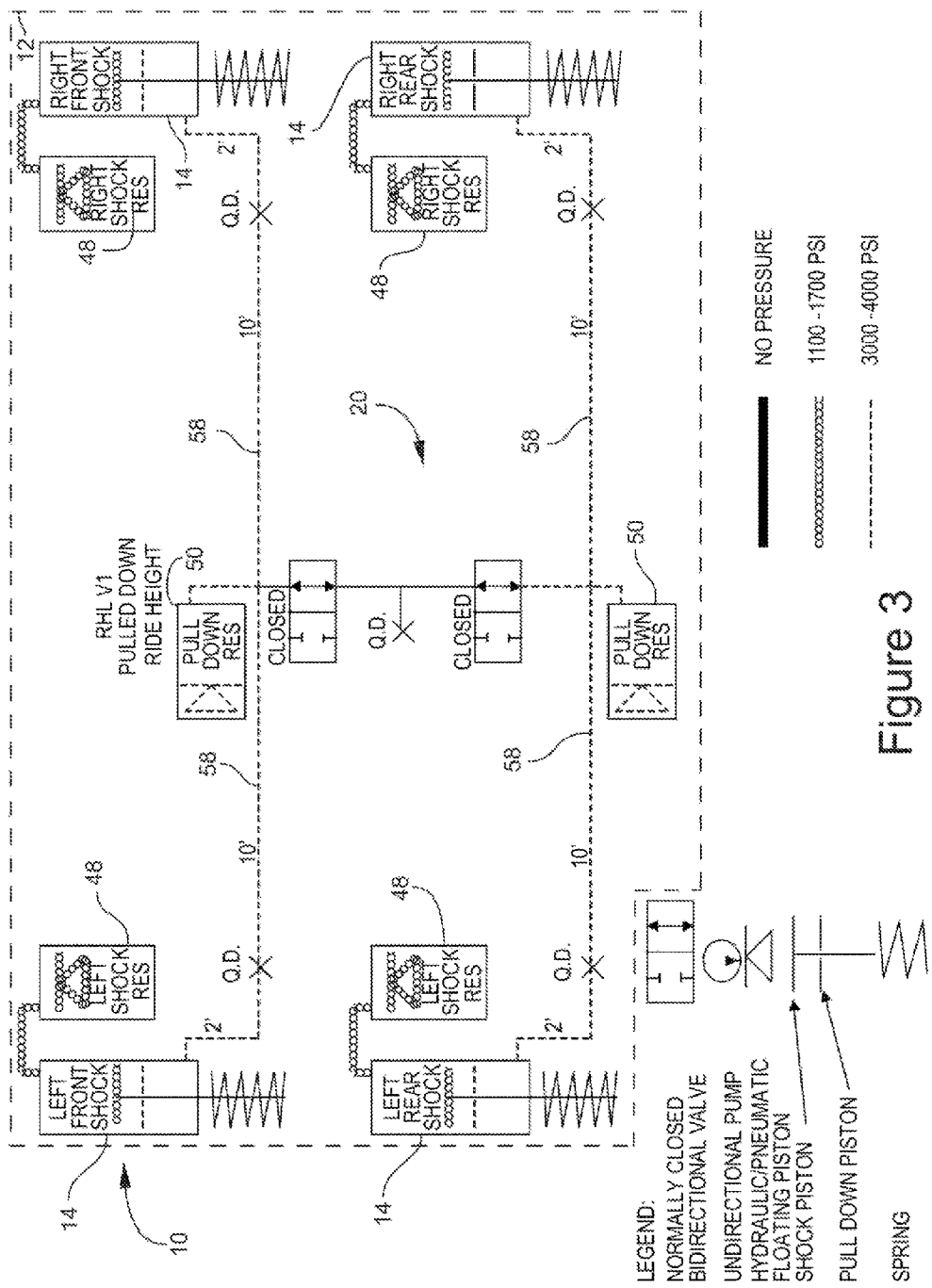
FIG. 3 illustrates a schematic representation of the hydraulic system for controlling the ride height of a vehicle shown in FIG. 1 with the ride height pulled down or in the lowered position.
Figure 4:
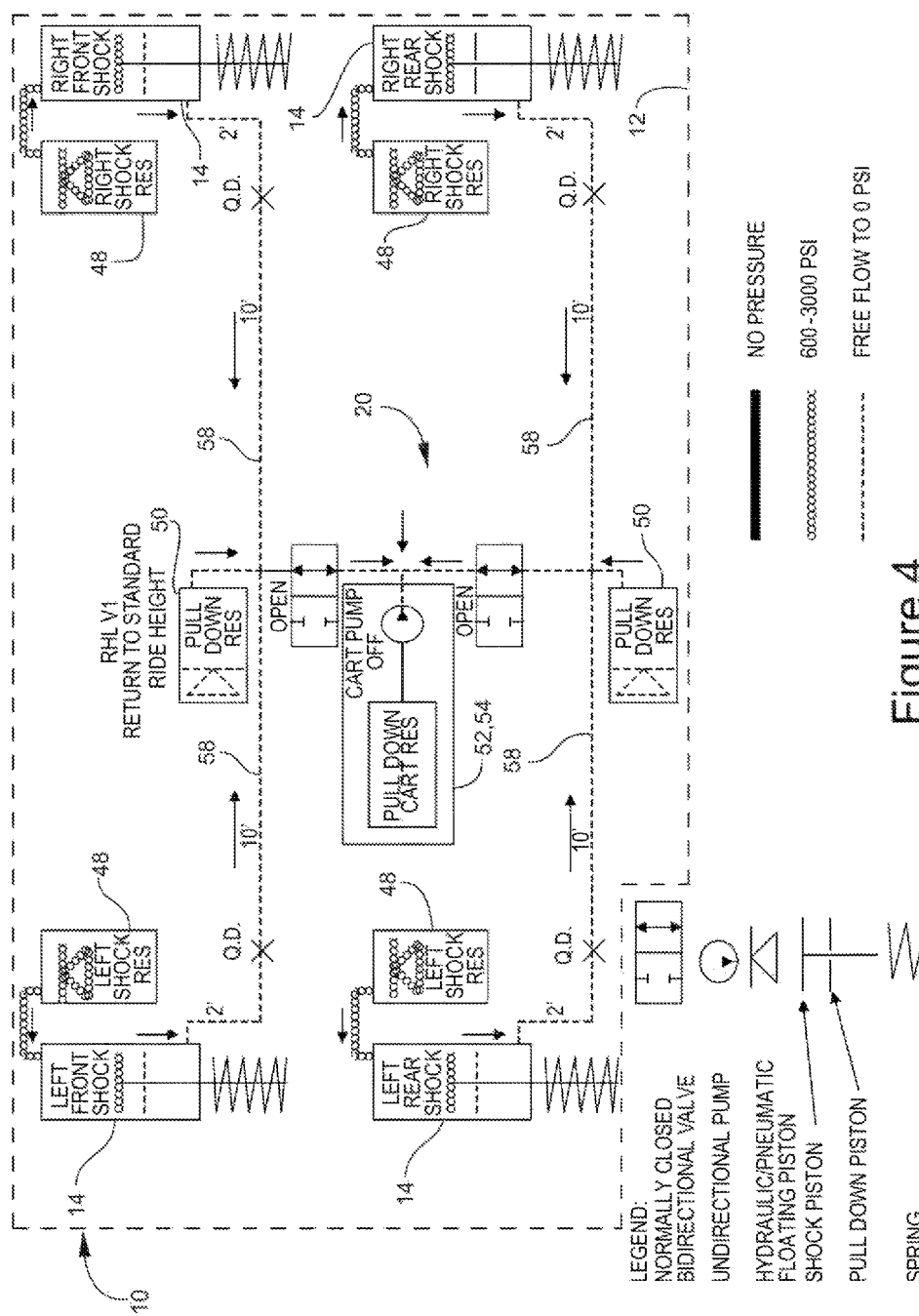
FIG. 4 illustrates a schematic representation of the hydraulic system for controlling the ride height of a vehicle shown in FIG. 1 with the ride height returning to standard height or being raised.

Referring to FIGS. 1-4, an embodiment of hydraulic system 10 for lowering the ride height of vehicle 12 is shown. In this embodiment, a central manifold 20 with a fluid accumulator 50 (pull down res) is included for left and right front shocks 14 and a second central manifold 20 is included with a second fluid accumulator 50 (pull down reservoir) for the left and right rear shocks 14. As shown in FIG. 1, when the vehicle 12 is riding at standard right hide, no pressure is supplied to fluid lines 58 via the central manifolds 20. At standard right hide, valves are closed to pull down cart reservoir (pull down reservoirs, or fluid accumulators 50), and each of the floating bearings 16 rest at the bottom 40 of their respective rebound chamber 38 where each hydraulic shock 14 acts as a standard hydraulic shock. When the vehicle 12 is being lowered, as shown in FIG. 2, valves are opened from pull down cart reservoir to the hydraulic shocks 14 and fluid from the pull down cart reservoir is pumped via pump 52 and power supply 54 through each fluid line 58 (for example, 3000-4000 psi) into the inlet 18 of each hydraulic shock 14. As each hydraulic shock is shortened, fluid is moved from each hydraulic shock 14 into its respective fluid reservoir 48 (for example 1100-1700 psi). As shown in FIG. 3, once the vehicle reaches the desired lowered ride height, the valves 59 from pump assembly 52,54 may be closed, where the system 10 operates, i.e., provides damping forces, at a lowered ride height. When the vehicle 12 needs to be raised, as shown in FIG. 4, the valves 59 to pump assembly 52,54 may then be opened and fluid may freely flow (i.e., flow to 0 psi) from inlet 18 of each shock 14 and pull down reservoir 50 back into pull down cart reservoir. Fluid may also flow back into hydraulic shocks 14 from their respective fluid reservoirs 48. This action may cause the floating bearings to fall back to the bottom 40 of rebound chamber 38 where the vehicle may return to a standard ride height.

Figure 5:
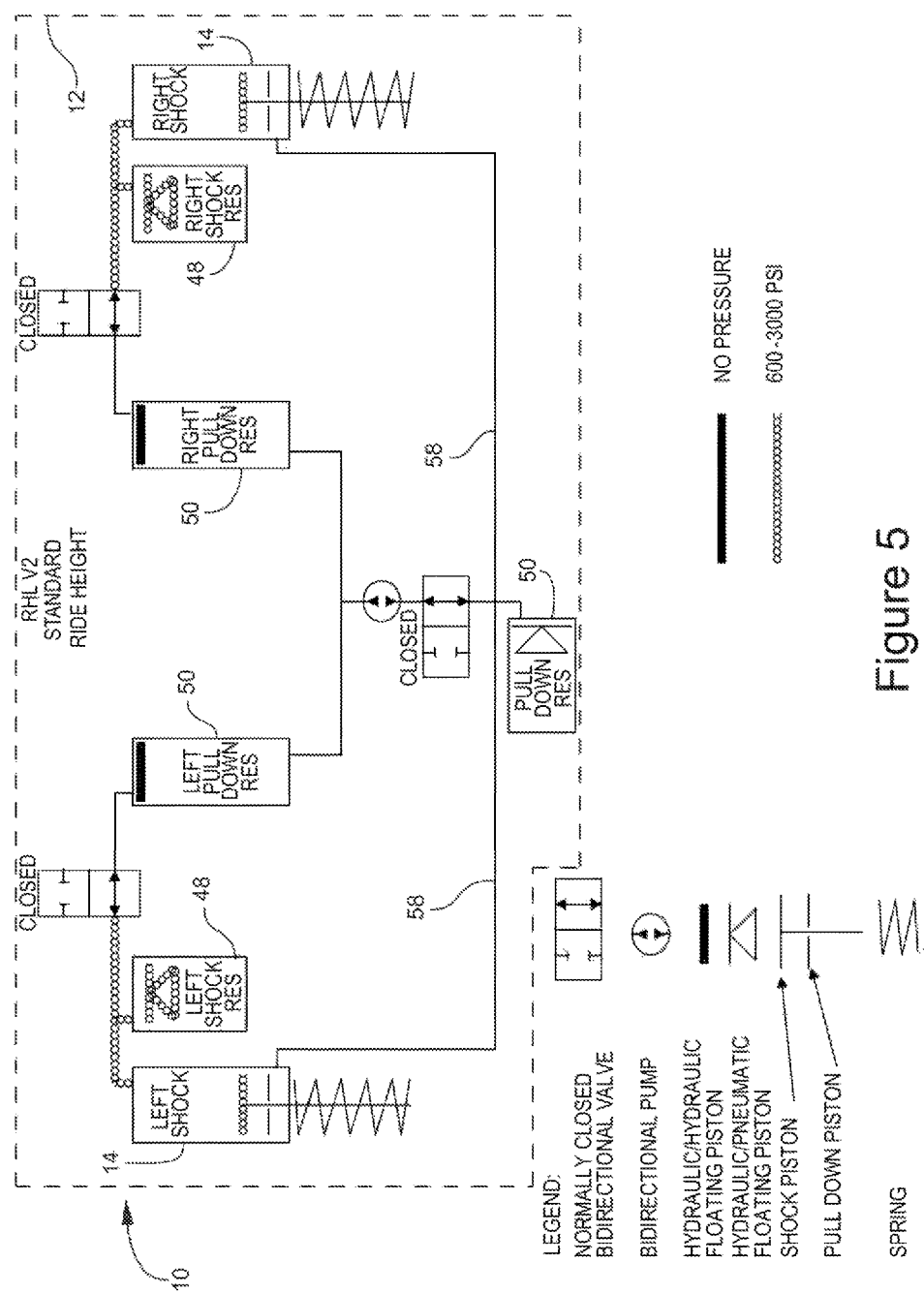
FIG. 5 illustrates a schematic representation of another embodiment of the hydraulic system for controlling the ride height of a vehicle according to the instant invention at standard ride height.
Figure 6:
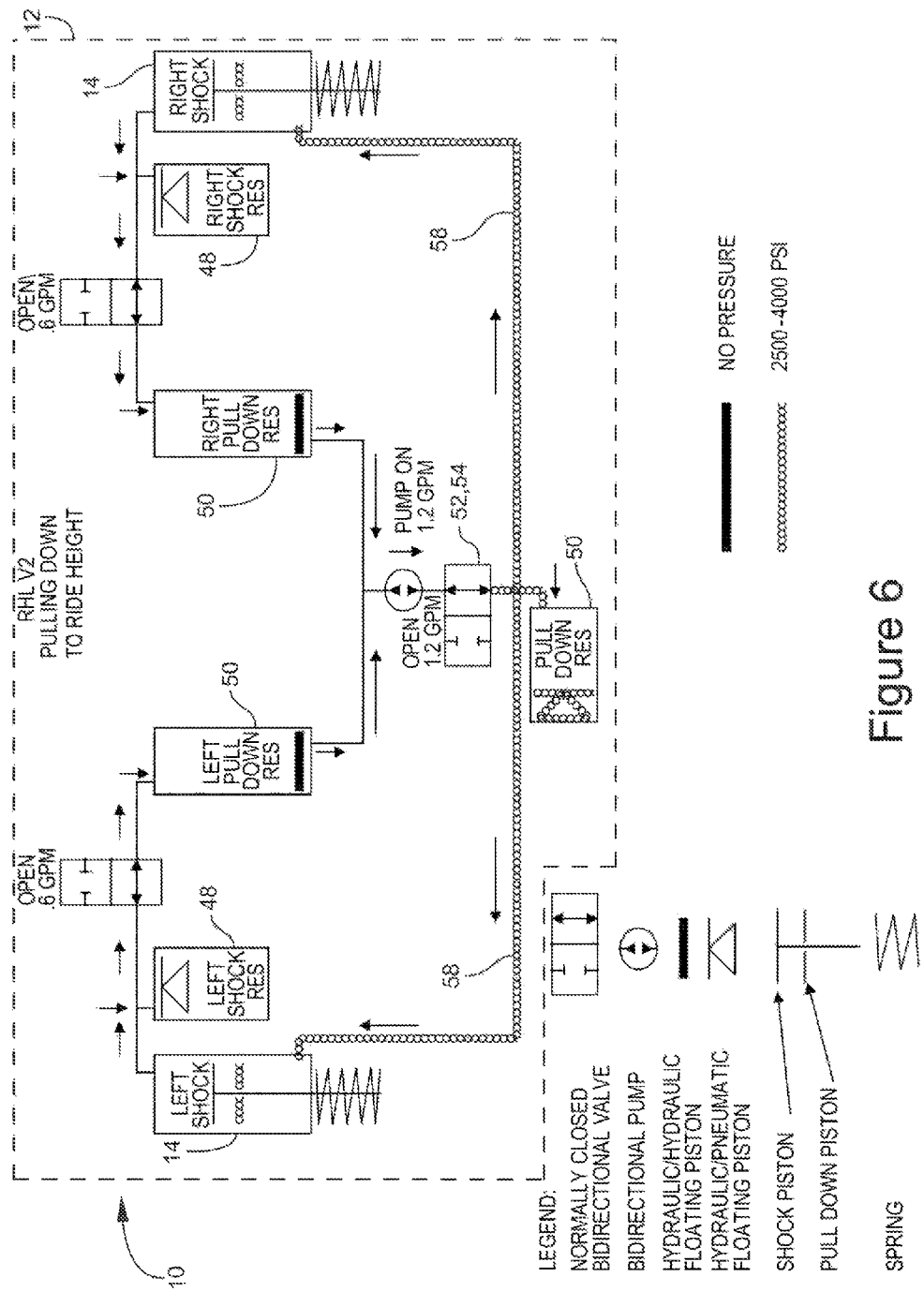
FIG. 6 illustrates a schematic representation of the hydraulic system for controlling the ride height of a vehicle shown in FIG. 5 with the ride height pulling down or being lowered.
Figure 7:
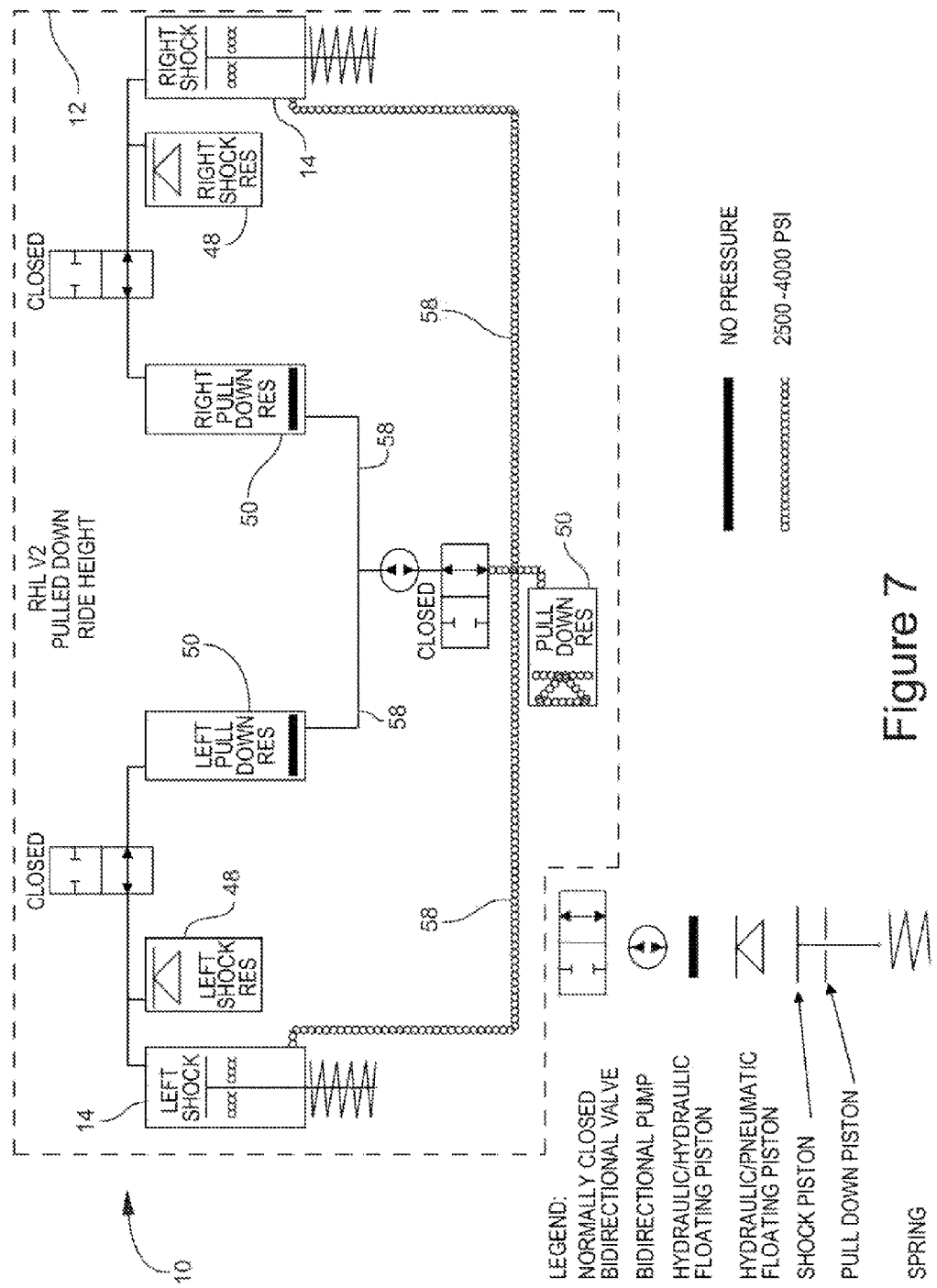
FIG. 7 illustrates a schematic representation of the hydraulic system for controlling the ride height of a vehicle shown in FIG. 5 with the ride height pulled down or in the lowered position.
Figure 8:
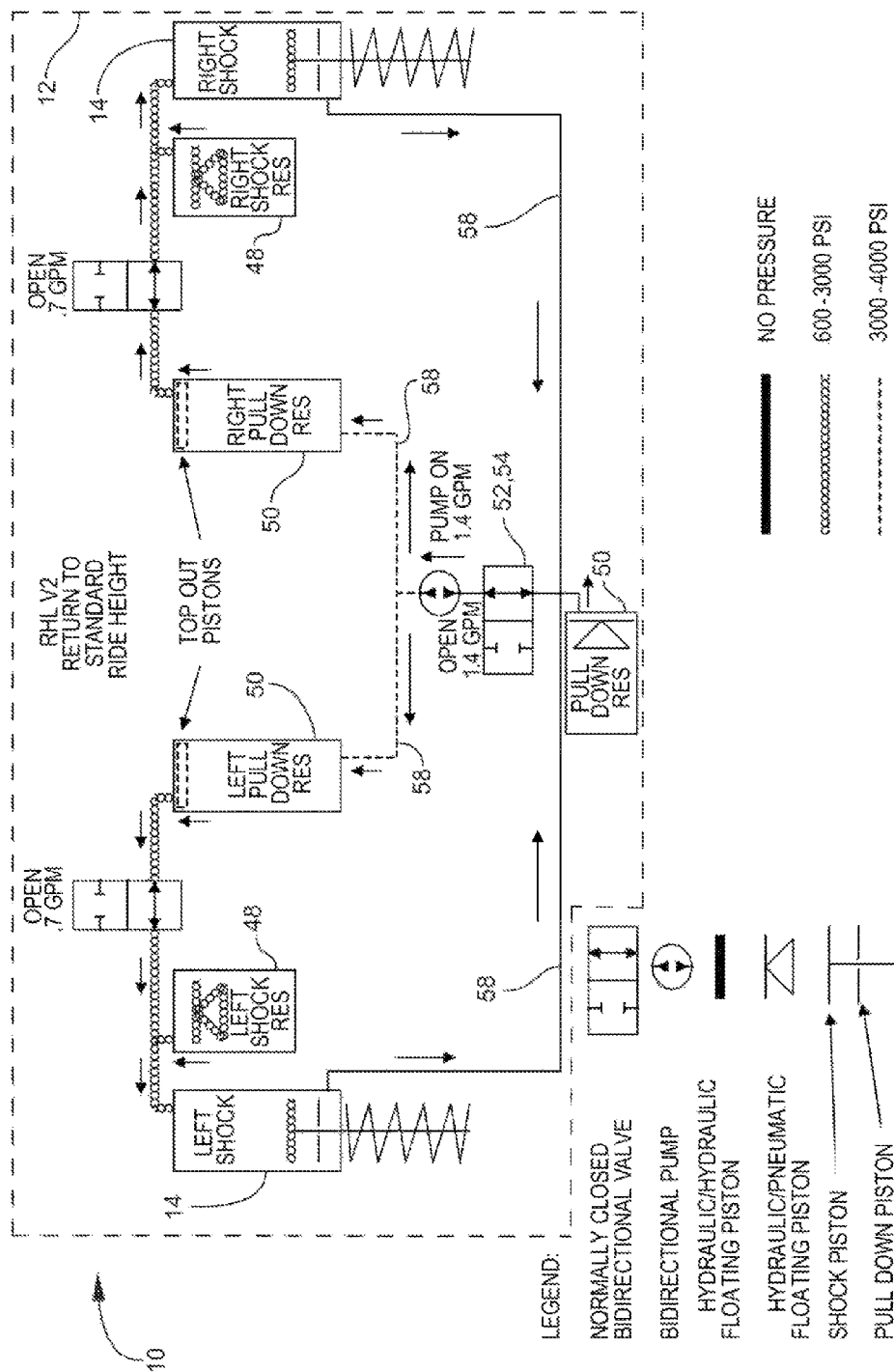
FIG. 8 illustrates a schematic representation of the hydraulic system for controlling the ride height of a vehicle shown in FIG. 5 with the ride height returning to standard height or being raised.
Figure 9:
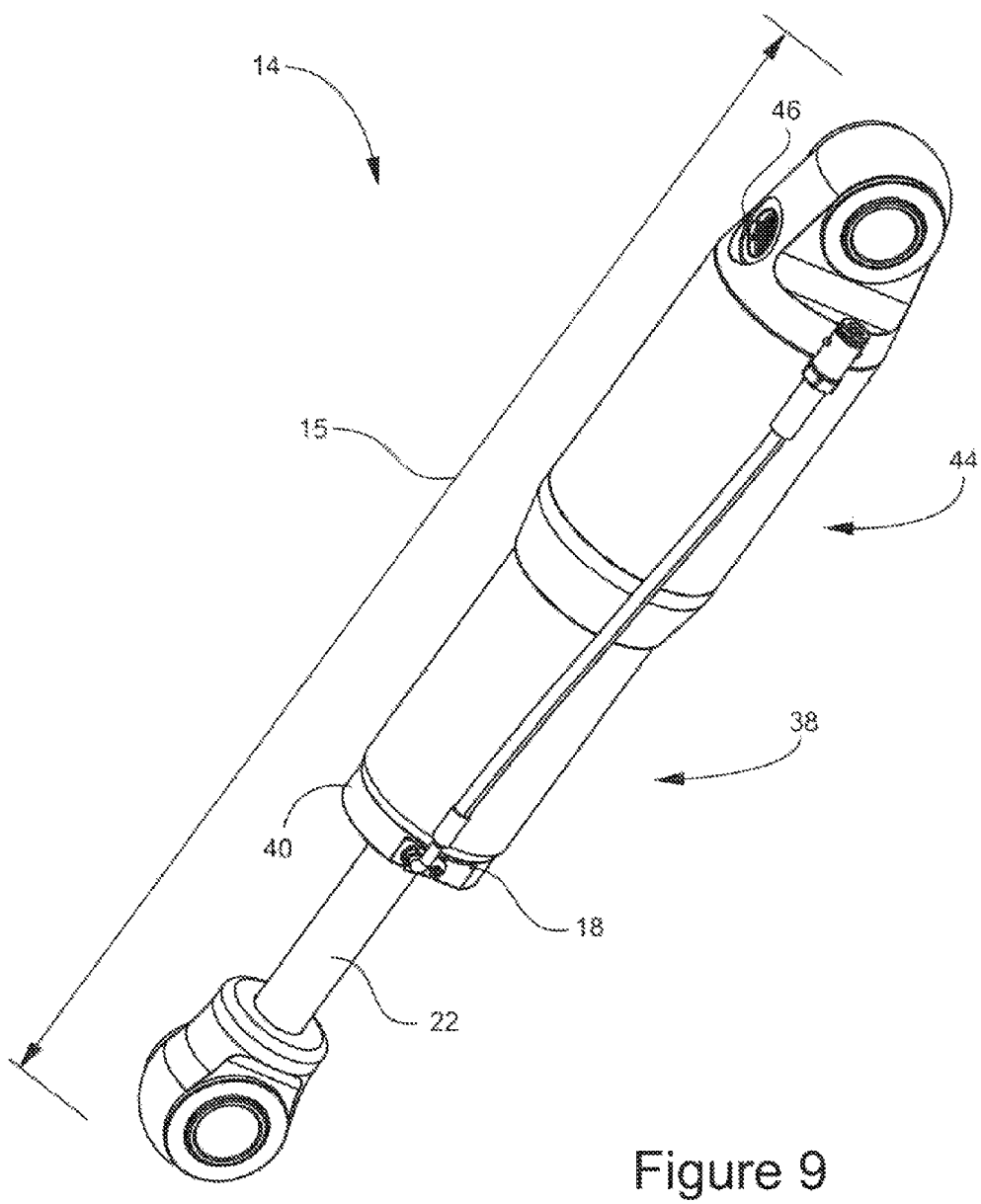
FIG. 9 shows a perspective view of one embodiment of the hydraulic shock for the hydraulic suspension system for lowering the ride height of a vehicle according to the instant invention.

Referring to FIGS. 5-8, another embodiment of hydraulic system 10 for lowering the ride height of vehicle 12 is shown. In this embodiment, a central manifold 20 with two fluid accumulators 50 (pull down reservoirs) is included for each left and right front shocks (this could be double for each of the left and right rear shocks). In this embodiment the fluid reservoirs 48 of each shock 14 are fluidly connected to their respective fluid accumulator 50. As shown in FIG. 5, when the vehicle 12 is riding at standard right hide, no pressure is supplied to fluid lines 58 via the central manifold 20. The left and right pull down reservoirs 50 in FIG. 5-8 have two chambers. When there is flow, for instance to lower the vehicle, there is fluid flowing into these reservoir from the compression chamber of each respective shock, and there is fluid flowing out through the pump and into the chamber below the floating bearings on each shock. At standard right hide, valves on both sides of the fluid accumulators 50 are closed, and each of the floating bearings 16 rest at the bottom 40 of their respective rebound chamber 38 where each hydraulic shock 14 acts as a standard hydraulic shock. When the vehicle 12 is being lowered, as shown in FIG. 6, valves are opened on each side of fluid accumulators 50 to the hydraulic shocks 14 and fluid from each fluid accumulator 50 is pumped via pump 52 and power supply 54 through each fluid line 58 (for example, 2500-4000 psi) into the inlet 18 of each hydraulic shock 14. As each hydraulic shock is shortened, fluid is moved from each hydraulic shock 14 into its respective fluid reservoir 50. At the same time, because the fluid reservoirs are connected to the fluid accumulators 50, the valves can be opened where the system moves to no pressure in the fluid reservoirs 48 (This would specifically refer to the fluid side. The air side will still have pressure and the floating piston will be bottomed out.). As shown in FIG. 7, once the vehicle reaches the desired lowered ride height, the valves on both sides of fluid accumulators 50 may be closed, where the system 10 operates, i.e., provides damping forces, at a lowered ride height. When the vehicle 12 needs to be raised, as shown in FIG. 8, the valves on both sides of fluid accumulators 50 may then be opened and fluid may be pumped back from inlet 18 of each shock 14 back into fluid accumulators 50. Fluid may also flow back into hydraulic shocks 14 from their respective fluid reservoirs 48 via fluid accumulator 50 (i.e. at 600-3000 psi). This action may cause fluid pressure in each shock 14 to increase thereby forcing the floating bearings to fall back to the bottom 40 of rebound chamber 38 where the vehicle may return to a standard ride height.

FIGS. 1-8 show various pressures and flow rates for the hydraulic system 10. These pressures and flow rates of system 10 are merely examples and are not meant to be limiting. The pressures and flow rates shown in FIGS. 1-8 may be, but are not limited to, pressures and flow rates for light trucks (i.e. trucks between 10,000-20,000 lbs). However, the pressures and flow rates used in hydraulic system 10 may vary depending on many parameters of the vehicle and system 10, including, but not limited to, the size and weight of the vehicle, the size of the shocks, the spring rates, the valves, the motion rates, the pull down times, the electrical power to pull down, the suspension spring rates, etc. Consequently, hydraulic system 10 may be designed to operate on a variety of different sized and shaped vehicles with a combination of different sized shocks and valves.

A method for lowering the ride height of a vehicle may be provided by utilizing the hydraulic system 10. The method may include any steps for utilizing system 10 for lowering the ride height of the vehicle. In one embodiment, the method for lowering the ride height of a vehicle may include the steps of: providing at least one hydraulic shock 14 as described above; mounting each of the hydraulic shocks 14 to the suspension of the vehicle; connecting a central manifold 20, as described above, to the inlet of each of the hydraulic shocks 14; and lowering the ride height of the vehicle by moving fluid from the central manifold 20 into each of the hydraulic shocks thereby moving the floating bearing 16 in each of the hydraulic shocks. In one embodiment of the method of lowering the ride height of the vehicle, the vehicle may be an automobile having four wheels, wherein the step of mounting each of the hydraulic shocks 14 to the suspension of the vehicle may include mounting four hydraulic shocks 14 to each of the wheels of the automobile.

Hydraulic system 10 for lowering the ride height of a vehicles, as shown and described above, provides many advantages over the prior art. System 10 can be installed on new vehicles or easily retrofitted to any existing vehicle. System 10 can also be configured in such a way that the hydraulic system is common to the whole vehicle. For example, if the vehicle has 4 wheels, not in a line, then the single hydraulic system can be used to lower the ride height of the 4-wheels and suspension corner modules. Electronic controllers, pressure regulating valves, and other considerations make the task of accomplishing this task very easy. Adequate provision (i.e. the thermal expansion means 60) may be provided within the accumulator 50 of the central manifold 20 for thermal expansion of the working hydraulic fluid. System 10 may enable a vehicle which is too tall to be transported in a vehicle or container to be able to fit inside or under the constraint, reducing the packaging and shipping concerns for the operator of the shipment. Hydraulic system 10 may function just like a shock absorber during normal operation. Only when system 10 has hydraulic power applied to it by central manifold 20 does the ride height lowering feature become engaged. The system may allow an operator to lower the ride height of the vehicle for purposes of transport, for purposes of functional driving, or for other reasons. System 10 may be capable of lowering a vehicle for transport to allow it to fit in an existing vehicle compartment, container, shipping hold, or other shipping location, thereby saving money by reducing or eliminating the need to purchase newer or modified shipping vessels, containers, or other shipping means.

As examples, system 10 may be utilized where the vehicle may need to be lowered to fit under an access door, to fit inside of a shipping container or vehicle, or to traverse beneath any other obstacle. However, the invention is not so limited and system 10 may be utilized for other purposes. The system 10 may enable the vehicle 12 to be lowered in a short period of time, while ensuring a minimum of functionality of the suspension for purposes of loading and unloading. The use of system 10 may allow for vehicle 12 to be lowered while not being locked with mechanical struts when lowered. As a result, system 10 has some compliance or damping in the suspension when lowered, which improves the transportability of the vehicle because the vehicle is not subjected to harsh bumps or jarring impacts during transport.

As another example, system 10 may be utilized for multipurpose vehicles like personal trucks, sports utility vehicles or military vehicles that come standard with large ride heights but are also intended to be driven on roads. This feature of system 10 may be useful for vehicles that have to perform in a wide range of terrain. System 10 may enable the multipurpose vehicle to operate at standard ride height when desired and then be lowered in a short period of time for smoother roads that are traveled at higher speeds. System 10 may lower the ride height of such multi-purpose vehicles while maintaining at least some damping forces.

As yet another example, system 10 may be used in conjunction with a hydraulic anti-roll system as shown and described in U.S. patent application Ser. No. 12/862,866. System 10 may be used in conjunction with the hydraulic anti-roll system for many purposes, including, but not limited to locking a military vehicle into certain positions and heights for firing weapons. In this example, system 10 may be engaged on one or more wheels of a vehicle to adjust the angle and/or height of the vehicle. In conjunction, the hydraulic anti-roll system of U.S. patent application Ser. No. 12/862, 866 may provide anti-roll damping forces to the vehicle, thus allowing the vehicle to be positioned at different heights and angles safely.

As yet another example, system 10 may be utilized to stabilize the position of a vehicle on a grade, a side, or a slope. In this example, when a vehicle is positioned or traveling on a grade, a side, or a slope, system 10 may be powered on one or more wheels of the vehicle in order to aid in leveling out the vehicle. This utilization of system 10 may allow a vehicle to be locked into a certain angle or position for safer traveling or positioning on a grade, a side, or a slope.

The present invention may be embodied in other forms without departing from the spirit and the essential attributes thereof, and, accordingly, reference should be made to the appended claims, rather than to the foregoing specification, as indicated in the scope of the invention.

The invention claimed is:

1. A hydraulic suspension system for lowering the ride height of a vehicle comprising:
   at least one hydraulic shock mounted to the suspension of the vehicle;
   each of said hydraulic shocks including:
      a floating bearing in said hydraulic shock; and
      an inlet hydraulically connected to a central manifold;
   said central manifold being adapted to pump fluid into each of said hydraulic shocks for moving said floating bearing in each of the hydraulic shocks;
   said central manifold comprising:
      a pump including a power supply;
      a hydraulic connection and fluid line for each hydraulic shock; and
      said pump being adapted to pump fluid through each of said hydraulic connections and fluid lines for lowering the ride height of the vehicle;
   wherein, when said floating bearing being moved in said hydraulic shock, said floating bearing shortening said hydraulic shock thereby lowering the ride height of the vehicle.

2. The hydraulic suspension system for lowering the ride height of a vehicle of claim 1 wherein said central manifold further comprising a fluid accumulator, wherein said pump being adapted to pump fluid from said fluid accumulator through each of said hydraulic connections and fluid lines for lowering the ride height of the vehicle.

3. The hydraulic suspension system for lowering the ride height of a vehicle of claim 1 wherein said central manifold further comprising a valve to adjust or control the fluid flowing through each of said hydraulic connections from said pump.

4. The hydraulic suspension system for lowering the ride height of a vehicle of claim 1 wherein said central manifold having thermal expansion means being adapted to adjust for thermal expansion of said fluid.

5. The hydraulic suspension system for lowering the ride height of a vehicle of claim 4 wherein said thermal expansion means being a floating piston.

6. The hydraulic suspension system for lowering the ride height of a vehicle of claim 1 wherein, when said floating bearing being moved and said hydraulic shock being shortened, fluid may be removed from said hydraulic shock through said inlet and back into said central manifold thereby lengthening said hydraulic shock.

7. The hydraulic suspension system for lowering the ride height of a vehicle of claim 1 further comprising a fluid reservoir for each of said hydraulic shocks, each of said fluid reservoirs adapted to take up hydraulic fluid from said hydraulic shocks when the ride height of said vehicle being lowered.

8. The hydraulic suspension system for lowering the ride height of a vehicle of claim 1 wherein said vehicle being an automobile with four wheels, where said system including four hydraulic shocks attached to each wheel.

9. The hydraulic suspension system for lowering the ride height of a vehicle of claim 1 wherein:
   said floating bearing being mounted on a piston rod in said hydraulic shock, where said floating bearing being able to move longitudinally along said piston rod;
   said floating bearing having a first fluid tight seal between an outer wall of said floating bearing and an inside wall of said hydraulic shock and having a second fluid tight seal between an inner wall of said floating bearing and an outside wall of said piston rod; and
   said floating bearing having a donut shaped cross-section;
   said floating bearing being positioned in the rebound chamber of said hydraulic shock; and
   said inlet being positioned approximate to the bottom of said rebound chamber, whereby when fluid being moved from said central manifold to said rebound chamber said floating bearing being raised in said rebound chamber, thereby shortening the length of said hydraulic shock.

10. A hydraulic suspension system for lowering the ride height of a vehicle comprising:
    at least one hydraulic shock mounted to the suspension of the vehicle;
    each of said hydraulic shocks including:
       a floating bearing in said hydraulic shock; and
       an inlet hydraulically connected to a central manifold;
    said central manifold being adapted to pump fluid into each of said hydraulic shocks for moving said floating bearing in each of the hydraulic shocks;
    said central manifold having thermal expansion means being adapted to adjust for thermal expansion of said fluid;
    wherein, when said floating bearing being moved in said hydraulic shock, said floating bearing shortening said hydraulic shock thereby lowering the ride height of the vehicle.

11. The hydraulic suspension system for lowering the ride height of a vehicle of claim 10 wherein said thermal expansion means being a floating piston.

12. The hydraulic suspension system for lowering the ride height of a vehicle of claim 10 wherein said central manifold comprising:
    a fluid accumulator;
    a pump including a power supply; and
    a hydraulic connection and fluid line for each hydraulic shock; and
    wherein, said pump being adapted to pump fluid from said fluid accumulator through each of said hydraulic connections and fluid lines for lowering the ride height of the vehicle.

13. The hydraulic suspension system for lowering the ride height of a vehicle of claim 12 wherein said central manifold further comprising a valve to adjust or control the fluid flowing through each of said hydraulic connections from said pump.

14. The hydraulic suspension system for lowering the ride height of a vehicle of claim 10 wherein, when said floating bearing being moved and said hydraulic shock being shortened, fluid may be removed from said hydraulic shock through said inlet and back into said central manifold thereby lengthening said hydraulic shock.

15. The hydraulic suspension system for lowering the ride height of a vehicle of claim 10 further comprising a fluid reservoir for each of said hydraulic shocks, each of said fluid reservoirs adapted to take up hydraulic fluid from said hydraulic shocks when the ride height of said vehicle being lowered.

16. The hydraulic suspension system for lowering the ride height of a vehicle of claim 10 wherein said vehicle being an automobile with four wheels, where said system including four hydraulic shocks attached to each wheel.

17. The hydraulic suspension system for lowering the ride height of a vehicle of claim 10 wherein:
   said floating bearing being mounted on a piston rod in said hydraulic shock, where said floating bearing being able to move longitudinally along said piston rod
   said floating bearing having a first fluid tight seal between an outer wall of said floating bearing and an inside wall of said hydraulic shock and having a second fluid tight seal between an inner wall of said floating bearing and an outside wall of said piston rod;
   said floating bearing having a donut shaped cross-section.
   said floating bearing being positioned in the rebound chamber of said hydraulic shock; and
   said inlet being positioned approximate to the bottom of said rebound chamber, whereby when fluid being moved from said central manifold to said rebound chamber said floating bearing being raised in said rebound chamber, thereby shortening the length of said hydraulic shock.

18. A method for lowering the ride height of a vehicle comprising the steps of:
   providing at least one hydraulic shock, where each of said hydraulic shocks including:
      a floating bearing in said hydraulic shock; and
      an inlet;
   mounting each of said hydraulic shocks to the suspension of the vehicle;
   connecting a central manifold to the inlet of each of said hydraulic shocks comprising:
      a pump including a power supply; and
      a hydraulic connection and fluid line for each hydraulic shock; and
      wherein, said pump being adapted to pump fluid from said fluid accumulator through each of said hydraulic connections and fluid lines for lowering the ride height of the vehicle;
   lowering the ride height of the vehicle by moving fluid from said central manifold into each of said hydraulic shocks thereby moving said floating bearing in each of the hydraulic shocks.

19. The method for lowering the ride height of a vehicle of claim 18 wherein said central manifold having thermal expansion means being adapted to adjust for thermal expansion of said fluid.

20. The method for lowering the ride height of a vehicle of claim 18 wherein said vehicle being an automobile having four wheels, wherein said step of mounting each of said hydraulic shocks to the suspension of the vehicle including mounting four hydraulic shocks to each of the wheels of said automobile.

* * * * *